United States Patent
Li et al.

(10) Patent No.: US 10,474,544 B1
(45) Date of Patent: Nov. 12, 2019

(54) DISTRIBUTED MONITORING AGENTS FOR CLUSTER EXECUTION OF JOBS

(71) Applicant: Workday, Inc., Pleasanton, CA (US)

(72) Inventors: Zhenqi Li, San Ramon, CA (US); Liang Huang, San Leandro, CA (US); Lei Gao, Pleasanton, CA (US); Hongze Lai, Pleasanton, CA (US)

(73) Assignee: Workday, Inc., Pleasanton, CA (US)

( * ) Notice: Subject to any disclaimer, the term of this patent is extended or adjusted under 35 U.S.C. 154(b) by 205 days.

(21) Appl. No.: 15/652,735

(22) Filed: Jul. 18, 2017

(51) Int. Cl.
G06F 11/00 (2006.01)
G06F 11/14 (2006.01)
G06F 11/07 (2006.01)
G06F 9/50 (2006.01)

(52) U.S. Cl.
CPC ........ *G06F 11/1482* (2013.01); *G06F 9/5011* (2013.01); *G06F 11/0709* (2013.01); *G06F 11/1438* (2013.01); *G06F 11/1464* (2013.01)

(58) Field of Classification Search
CPC .. G06F 11/1464; G06F 3/1259; G06F 3/1273; G06F 11/1438
See application file for complete search history.

(56) References Cited

U.S. PATENT DOCUMENTS

| | | | |
|---|---|---|---|
| 6,718,486 B1* | 4/2004 | Roselli ................ | G06F 11/1438 714/41 |
| 6,799,147 B1* | 9/2004 | Balasubramanian ........ | G06F 11/0748 702/186 |
| 2004/0205414 A1* | 10/2004 | Roselli ..................... | H02H 3/05 714/39 |
| 2012/0054754 A1* | 3/2012 | Teichmann ........... | H04L 41/082 718/102 |

* cited by examiner

*Primary Examiner* — Charles Ehne
(74) *Attorney, Agent, or Firm* — Van Pelt, Yi & James LLP

(57) ABSTRACT

A system with distributed monitoring agents include a state storage, a plurality of worker agents, a first processor, and a second processor. A job is executed using a worker agent of the plurality of worker agents. The first processor is configured to execute a first monitor to monitor the job and to restart the job using job state data stored in the state storage in the event that the job fails to successfully complete. The second processor is configured to execute a second monitor to monitor the first monitor and to restart the first monitor using first monitor state data stored in the state storage in the event that the first monitor crashes.

22 Claims, 8 Drawing Sheets

DISTRIBUTED MONITORING AGENTS FOR CLUSTER EXECUTION OF JOBS

BACKGROUND OF THE INVENTION

Cluster computing systems processing streaming jobs on large data sets are required to perform the same query many times as data is received or a data set is updated. The query can be required to run repeatedly over a period of hours, days, or months. A streaming query processing system thus requires unusually high reliability, creating a problem where even systems designed for reliability are not likely to be reliable enough over the long period of time.

BRIEF DESCRIPTION OF THE DRAWINGS

Various embodiments of the invention are disclosed in the following detailed description and the accompanying drawings.

DETAILED DESCRIPTION

Figure 1:
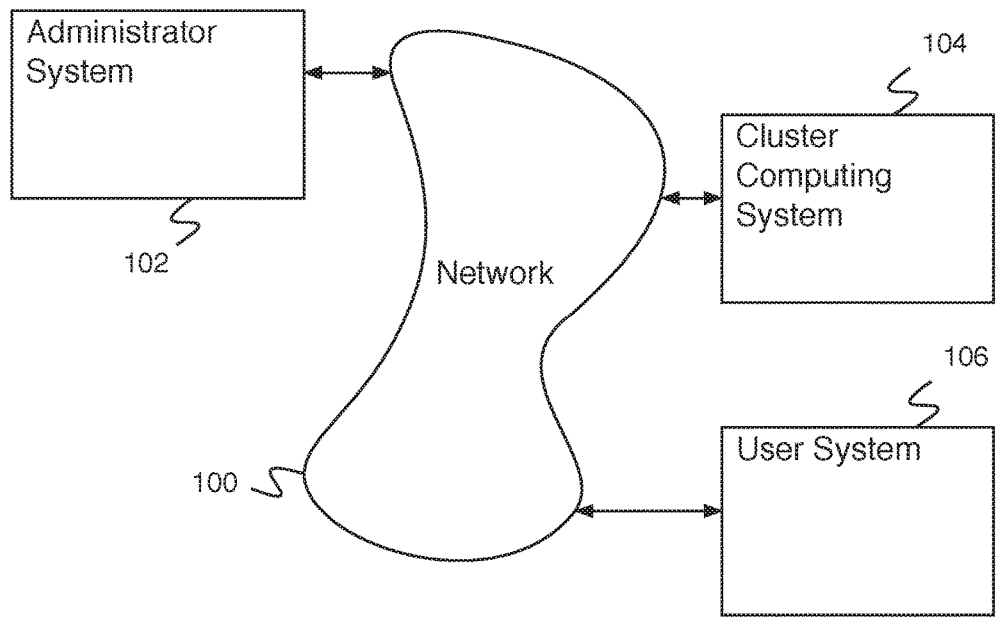
FIG. 1 is a block diagram illustrating an embodiment of a network system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system with distributed monitoring agents comprises a state storage, a plurality of worker agents, wherein a job is executed using a worker agent of the plurality of worker agents, a first monitor, wherein the first monitor monitors the job to restart the job using job state data stored in the state storage in the event that the job fails to successfully complete, and a second monitor, wherein the second monitor monitors the first monitor to restart the first monitor using first monitor state data stored in the state storage in the event that the first monitor crashes. In some embodiments, the system with distributed monitoring agents additionally comprises a memory coupled to the processor and configured to provide the processor with instructions.

A system with distributed monitoring agents comprises a cluster system for processing a parallel computing job. The cluster system comprises a plurality of cluster worker agents for executing jobs or parts of jobs. One cluster worker agent is designated as a cluster master system. The cluster master system receives job requests, provides parts of jobs to the other cluster worker agents for execution, and assembles the results of the parts of jobs to form a complete job result. The cluster system additionally comprises a state storage for storing the state of the worker agents and the master system as jobs proceed.

The cluster master system comprises a monitor for monitoring the jobs executing on the cluster worker agents. In the event that a job running on the cluster worker agent does not complete successfully (e.g., the cluster worker agent crashes, the job becomes permanently stuck, etc.), the monitor identifies that the job did not complete successfully and acts to restart the job. The monitor determines a new cluster worker agent to restart the job, indicates to transfer state data for the job from the state storage to the new cluster worker agent, and indicates to the new cluster worker agent to start the job.

A worker agent of the plurality of worker agents comprises a monitor for monitoring the master system. In some embodiments, more than one of the plurality of worker agents comprise a monitor for monitoring the master system. In the event that the master system crashes, the monitor identifies that the master system has crashed and acts to restart the master system. A worker system is determined to serve as the new master system, and the monitor provides an indication to that worker system to become the new master system. The monitor additionally indicates to transfer master system state data from the state storage to the new master system. Finally, a monitor is started on the new master system for monitoring the worker agents.

FIG. 1 is a block diagram illustrating an embodiment of a network system. In some embodiments, the network system of FIG. 1 comprises a system for executing a job using a cluster system. In the example shown, a user using user system 106 submits a job to cluster computing system 104 via network 100. The job is then broken up into tasks that are processed within the cluster system by a master system to a number of worker systems. The tasks are monitored using a master monitor. In the event that a task fails to complete, the master monitor restarts the task using the same or a different worker system. To ensure that the system is even more robust, one or more monitors monitor the master monitor. In the event that the master monitor fails, the one or more monitors restart the master monitor. State data for restarting a task or the master monitor is stored using a state storage system that is part of the cluster system either as a separate storage system or distributed through various systems of the cluster system. An administrator using administrator system 102 is able to access cluster computing system 104 and perform administration of the cluster system including system maintenance, upgrades, and installations as well as monitoring. Administrator system 102 comprises an administrator system for executing administrator commands, for executing jobs using cluster computing system 104, for executing a streaming query on cluster computing system 104, for querying the status of jobs on cluster computing system 104, or for any other appropriate administrator system purpose.

In the example shown, network 100 provides communication connectivity for administrator system 102, cluster computing system 104, and user system 106. In various embodiments, network 100 comprises one or more of the following: a local area network, a wide area network, a wired network, a wireless network, the Internet, an intranet, a storage area network, or any other appropriate communication network. Cluster computing system 104 comprises a cluster computing system for executing cluster computing jobs. In some embodiments, cluster computing system 104 comprises a system with distributed monitoring agents. In various embodiments, cluster computing system 104 comprises a computer, a multiprocessor computer, a plurality of computers, a plurality of multiprocessor computers, or any other appropriate cluster computing system. In some embodiments, cluster computing system 104 comprises a plurality of individual cluster systems. In some embodiments, cluster computing system 104 comprises a cluster computing system for executing streaming cluster computing jobs. In some embodiments, cluster computing system 104 comprises a cluster computing system for executing jobs with very high reliability. In various embodiments, a cluster system user comprises a user executing data processing jobs using the cluster system, a user using applications running on the cluster system, a user providing data for analysis by the cluster system, or any other appropriate cluster system user.

Figure 2:
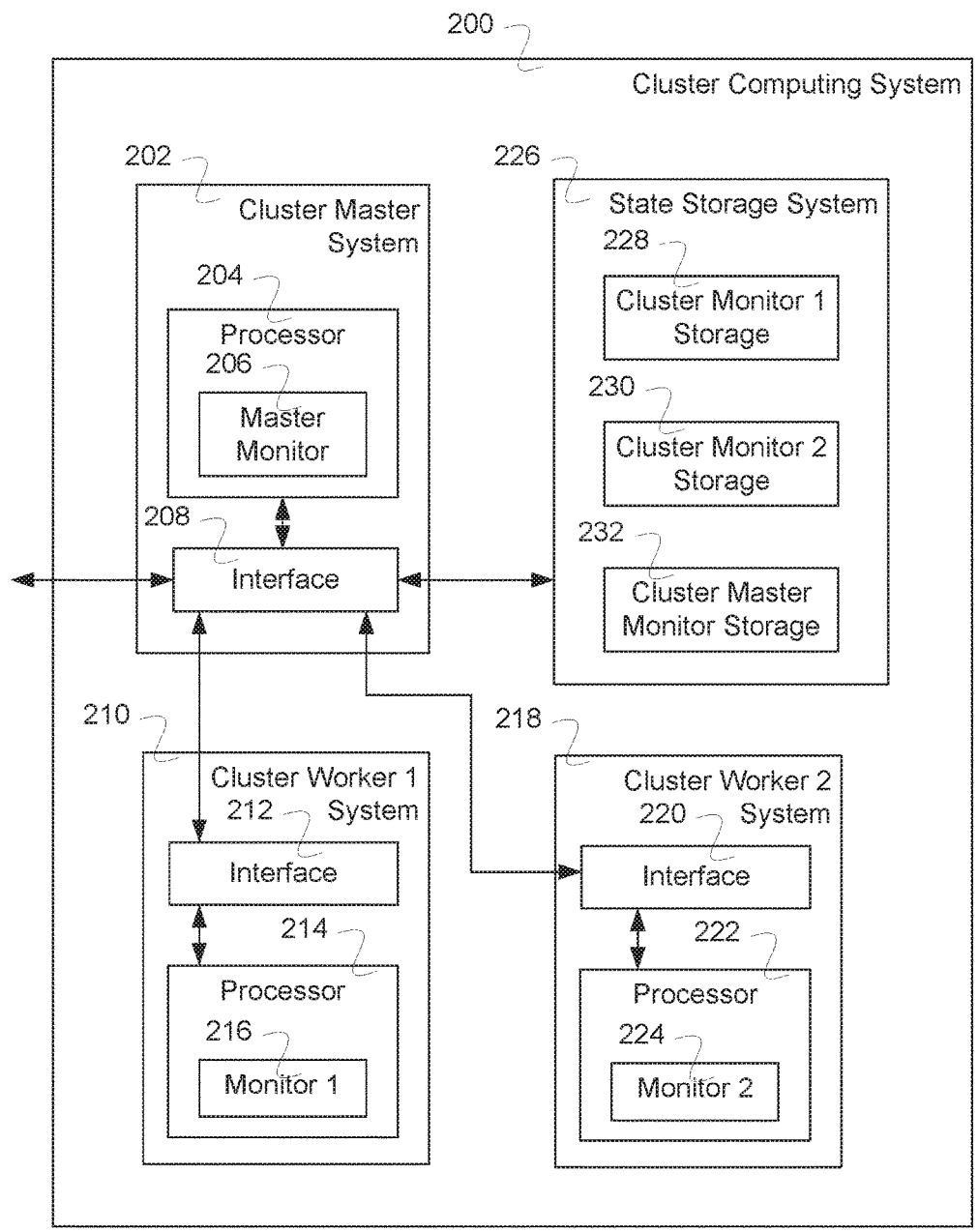
FIG. 2 is a block diagram illustrating an embodiment of a cluster system.

FIG. 2 is a block diagram illustrating an embodiment of a cluster system. In some embodiments, cluster system 200 comprises cluster computing system 104 of FIG. 1. In the example shown, cluster system 200 receives a job from a user using a user system. Cluster master system 202 receives the job to execute via interface 208 and breaks the job into one or more tasks using processor 204. The one or more tasks are distributed to one or more cluster worker systems (e.g., cluster worker 1 system 210 or cluster worker 2 system 218) via interface 208. A cluster worker system receives a task via an interface (e.g., interface 212 or interface 220) to execute the task using a processor (e.g., processor 214 or processor 222). A task executing in a cluster worker system is monitored using master monitor 206 with the task execution state stored in state storage system 226 (e.g., using cluster master monitor storage 232). In the event that the task fails to execute, master monitor 206 restarts the task using the same or other cluster worker system and using the state stored by master monitor 206 in cluster master monitor storage 232. In the event that master monitor 206 crashes, one or more monitors (e.g., monitor 1 216 or monitor 2 224) restart master monitor 206 using stored state data in storage associated with the one or more monitors (e.g., cluster monitor 1 storage 228 or cluster monitor 2 storage 230). Cluster master system 202 receives results of the executed tasks, assembles results to generate the job results, and provides the results to the user requesting the execution of the job.

In various embodiments, cluster system 200 includes a plurality of worker systems—for example, two, three, 6, 11, 115, or any other appropriate number of cluster worker systems. In some embodiments, cluster master system 202 comprises a cluster worker system that has been promoted to perform cluster master system tasks (e.g., a cluster master system and a cluster worker system comprise systems that have been configured the same way—a cluster master system comprises a system that has received a cluster master system promotion). State storage system 226 comprises a state storage system for storing the state of the subprocesses or subsystems of cluster computing system 200. In some embodiments, a monitor of master monitor 206 does not cause the storage of the state data directly, but instead tracks data being stored by cluster master system 202 directly on state storage system 226. For example, cluster master system 202 might directly store state data comprising one or more of the following: data describing jobs in process, data describing job portions or tasks allocated to cluster worker systems, data describing tasks in process on the cluster master system, or any other appropriate cluster master system state data. In some embodiments, master monitor 206 does not cause the storage of task execution data directly, but instead tracks data being stored by cluster worker systems (e.g., cluster worker 1 system 210 or cluster worker 2 system 218) directly on state storage system 226. For example, a cluster worker system might directly store data comprising one or more of the following: job progress information, intermediate job results, job metadata, data describing tasks in process on the cluster worker system, or any other appropriate cluster worker system data. In some embodiments, a job running on a cluster system provides job state data to state storage system 226. In various embodiments, state storage system 226 comprises a storage system, a distributed storage system, a database system, a cluster system, a redundant set of storage systems, or any other appropriate state storage system. In some embodiments, state storage system 226 comprises a storage system running the Apache Zookeeper™ system.

Cluster master system 202 includes master monitor 206 for monitoring each cluster worker system (e.g., cluster worker 1 system 210 or cluster worker 2 system 218). Master monitor 206 comprises a monitor (e.g., a monitoring job) for monitoring one or more tasks executing on worker agents. Monitoring tasks comprises monitoring whether tasks have completed or not completed successfully. A task is determined to have not completed successfully in the event that the system the task is running on crashes, in the event that the task enters an infinite loop, in the event that the task stops providing cluster worker system data to state storage system 226, or based on any other appropriate task incomplete information. In the event master monitor 206 determines that a task has not completed successfully, master monitor 206 restarts the task. Restarting the task comprises selecting a new worker system to execute the task, indicating to the worker system to execute the task, indicating to state storage system 226 to transfer data associated with the task to the selected worker system, or any other appropriate job task. Cluster worker 1 system 210 comprises monitor 1 216 (e.g., a monitoring job) for monitoring master monitor 206. Similarly, cluster worker 2 system 218 comprises monitor 2 224 for monitoring master monitor 206. In various embodiments, all cluster worker systems comprise a monitor, one cluster worker system comprises a monitor, a subset of the cluster worker systems comprises a monitor, or any other appropriate number of cluster worker systems comprise a monitor. In some embodiments, each monitor on a cluster worker system performs the same job. In the example shown, monitor 1 216 and monitor 2 224 each comprise a monitor for monitoring master monitor 206. In the event master monitor 206 crashes (e.g., stops functioning, becomes unresponsive, etc.), monitor 1 216 or monitor 2 224 act to restart cluster master system 202. In various embodiments, restarting cluster master system 202 comprises selecting a cluster worker system to become the new cluster master system, indicating to promote the cluster worker system to become the new cluster master system, indicating to state storage system 226 to provide cluster master system state data to the new cluster master system, or performing any other appropriate cluster master system restarting task. In some embodiments, selecting a cluster worker system to become the new cluster master system comprises selecting a cluster worker system to become the new cluster master system by a vote of cluster worker systems. In some embodiments, in the event the cluster master system is restarted in response to a cluster master system 202 crash, when cluster master system 202 becomes available again (e.g., after a reboot, after processes are killed, etc.), cluster master system 202 is reassigned as a cluster worker system (e.g., because another system has been promoted to be the cluster master system).

Figure 3:
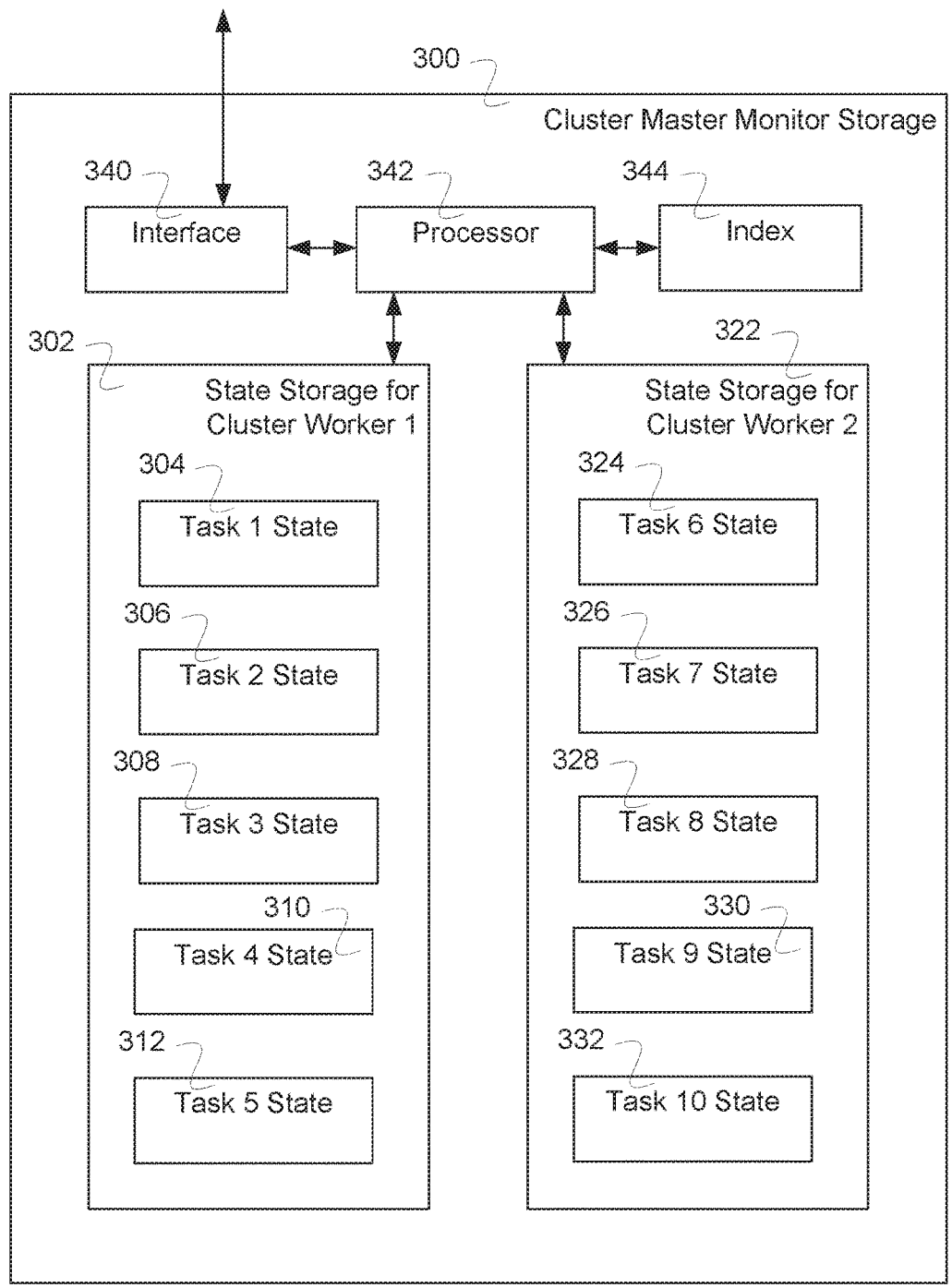
FIG. 3 is a block diagram illustrating an embodiment of a state storage system.

FIG. 3 is a block diagram illustrating an embodiment of a state storage system.

In some embodiments, cluster master monitor storage 300 comprises cluster master monitor storage 232 of FIG. 2. In the example shown, a cluster master receives a job from a user and breaks the job into a number of tasks. Each task is submitted to execute using a cluster worker. To ensure that each of the tasks completes so that output is generated for the job, a master monitor watches each task to make sure that the task completes and does not get stuck or crash. If the task gets stuck or crashes, the master monitor uses state data stored in a state storage to restart the task. Each task, when executing using a cluster worker system, provides intermediate state data to the state storage system to be stored for restoration of processing the task. For example, at an interim completion point within a task, the state of variables or intermediate results are stored. In some cases, there are no intermediate points stored and instead only the task inputs are stored. In some cases, increments to the output and state information are stored to indicate which inputs were processed to achieve that output. In the example shown, cluster master monitor storage 300 includes interface 340 to receive requests to store state data or to retrieve state data from storage. Processor 342 receives a request to store task state data and stores the task state data in a storage associated with a cluster worker (e.g., state storage for cluster worker 1 302 or state storage for cluster worker 2 322). The location of the stored task (e.g., task 1 state is stored in task 1 state 304; task 2 state is stored in task 2 state 306; task 3 state is stored in task 3 state 308; task 4 state is stored in task 4 state 310; task 5 state is stored in task 5 state 312; task 6 state is stored in task 6 state 324; task 7 state is stored in task 7 state 326; task 8 state is stored in task 8 state 328; task 9 state is stored in task 9 state 330; and task 10 state is stored in task 10 state 332) is stored in index 344 associated with state storage for a given cluster worker. Processor 342 receives a request to retrieve task state data and retrieves the task state data in a storage associated with a cluster worker (e.g., state storage for cluster worker 1 302 or state storage for cluster worker 2 322). The location of stored task data is retrieved from index 344. The location is used to retrieve stored state data.

In some embodiments, the tasks are stored not grouped by association with the cluster worker on which the task is executing, but instead are tracked using the index and can be stored anywhere in cluster master monitor storage.

In some embodiments, the task state storage and the cluster monitor state storage are comingled and tracked using a single index.

In various embodiments, the state storage is in a single storage device in a separate system or distributed among several systems to make the storage more failure tolerant. In some embodiments, multiple copies of each state storage are kept on separate systems to make the storage more failure tolerant.

Figure 4:
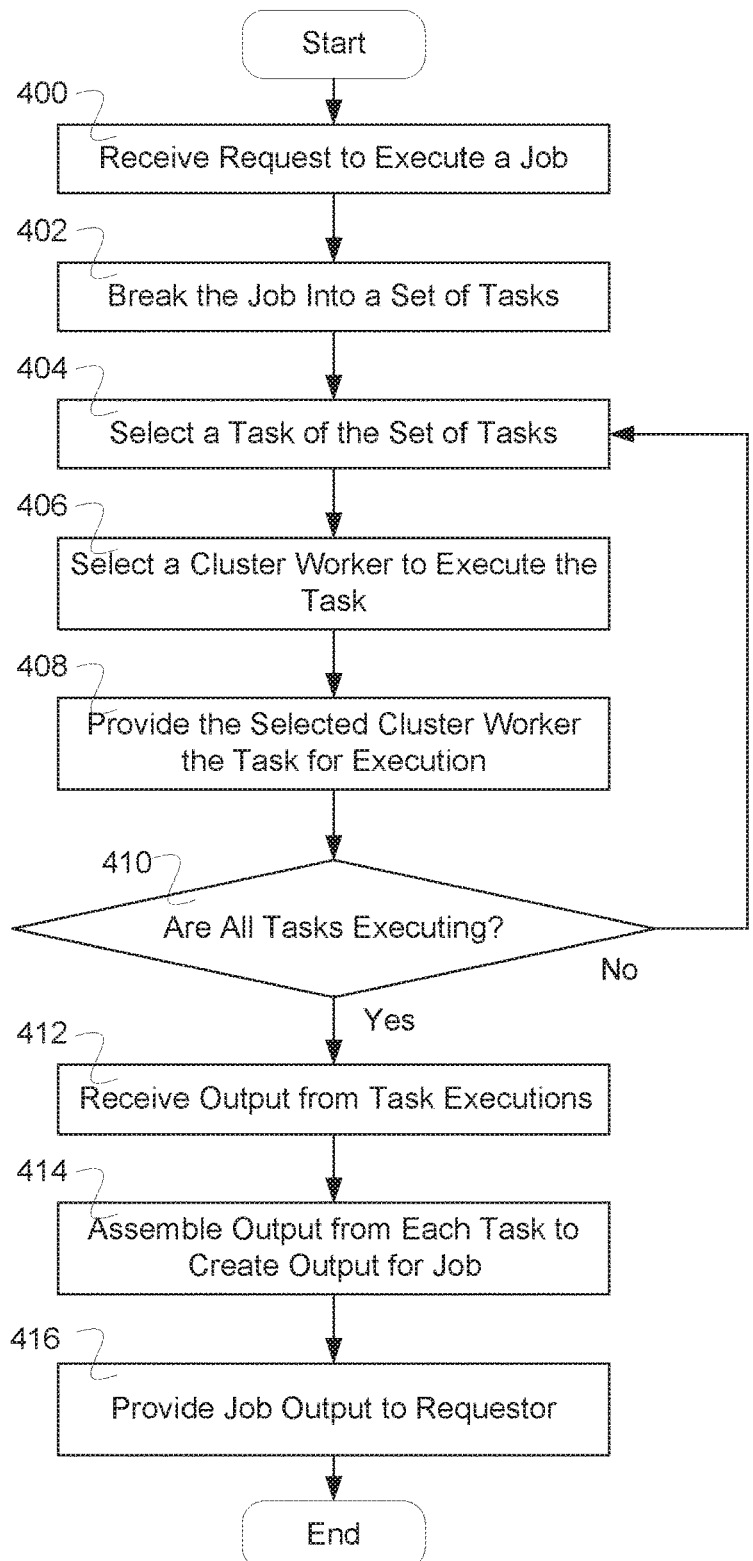
FIG. 4 is a flow diagram illustrating an embodiment of a process for a system with distributed monitoring agents.

FIG. 4 is a flow diagram illustrating an embodiment of a process for a system with distributed monitoring agents. In some embodiments, the process of FIG. 4 is executed by cluster computing system 104 of FIG. 1. In the example shown, in 400, a request is received to execute a job. In 402, the job is broken into a set of tasks. In 404, a task is selected of the set of tasks. In 406, a cluster worker is selected to execute the task. In 408, the selected cluster worker is provided the task for execution. In 410, it is determined whether all tasks are executing. In the event that all tasks are not executing, control passes to 404. In the event that all tasks are executing, in 412, output is received from task executions. In 414, output from each task is assembled to create output for the job. In 416, provide job output to requestor.

Figure 5:
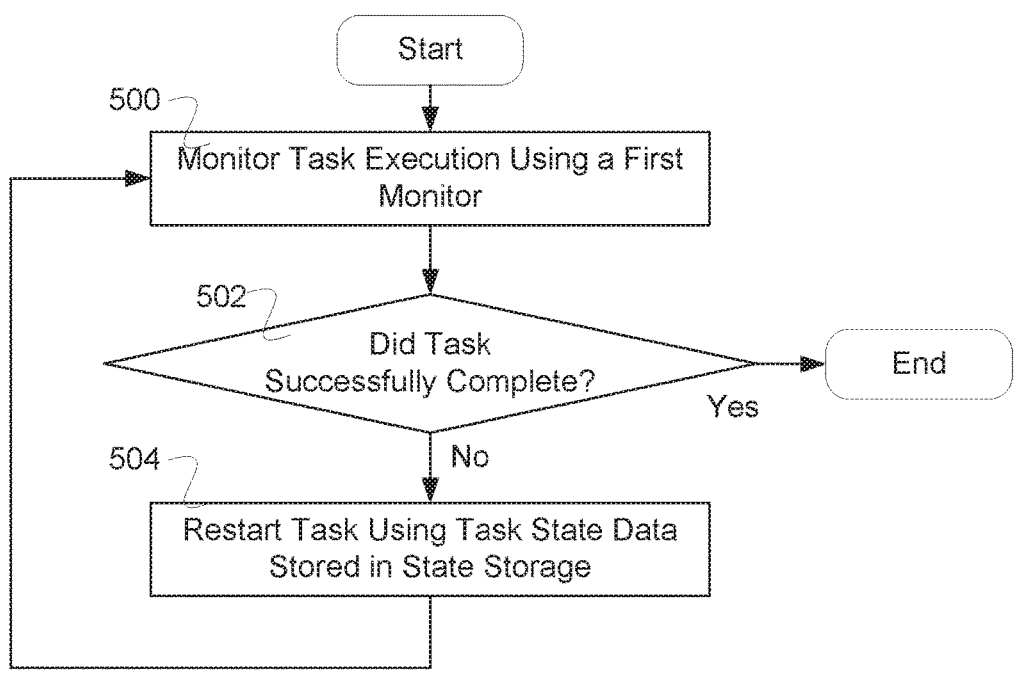
FIG. 5 is a flow diagram illustrating an embodiment of a process for monitoring task execution.

FIG. 5 is a flow diagram illustrating an embodiment of a process for monitoring task execution. In some embodiments, the process of FIG. 5 is used to monitor execution of a task as provided to a cluster worker in 408 of FIG. 4. In the example shown, in 500, a task execution is monitored using a first monitor. For example, the first monitor comprises a monitor running on a cluster master system or on any other appropriate system. In 502, it is determined whether the task has successfully completed. For example, determining that the job failed to successfully complete comprises determining that a worker agent running the job has crashed, determining that the job failed to successfully complete within a job timeout time, or determining that the job failed to successfully complete for any other appropriate reason or in any other appropriate way. In the event that it is determined that the task has successfully completed, the process ends. In the event that it is determined that the task has not successfully completed, in 504, the task is restarted using task state data stored in a state storage and control passes to 500. Restarting the task comprises selecting a new worker agent of the plurality of worker agents and restarting the task on the new worker agent.

Figure 6:
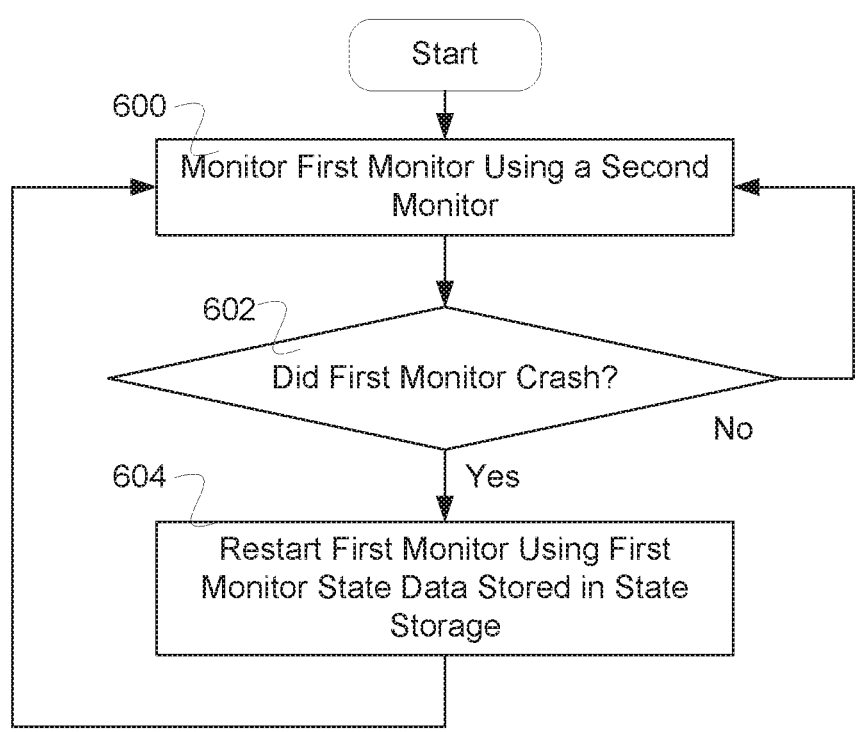
FIG. 6 is a flow diagram illustrating an embodiment of a process for monitoring a monitor.

FIG. 6 is a flow diagram illustrating an embodiment of a process for monitoring a monitor. In some embodiments, the process of FIG. 6 is used to monitor execution of the first monitor that monitors task execution in FIG. 5. In the example shown, in 600, a first monitor is monitored using a second monitor. In 602, it is determined whether the first monitor has crashed. In the event that the first monitor has not crashed, control passes to 600. In the event that the first monitor has crashed, in 604, the first monitor is restarted using first monitor state data stored in state storage. Restarting the first monitor comprises selecting a new worker agent of the plurality of worker agents and restarting the first monitor on the new worker agent. In some embodiments, restarting the first monitor additionally comprises designating the new worker agent as a new master system.

In some embodiments, the cluster system additionally comprises one or more additional monitors, wherein each monitor of the one or more additional monitors comprises a process running on a worker agent of the plurality of worker agents, wherein each monitor of the one or more additional monitors the first monitor to restart the first monitor using first monitor state data stored in the state storage in the event that the first monitor crashes. In various embodiments, the second monitor comprises a monitor running on a worker agent of the plurality of worker agents, on a cluster master system, or on any other appropriate system.

Figure 7:
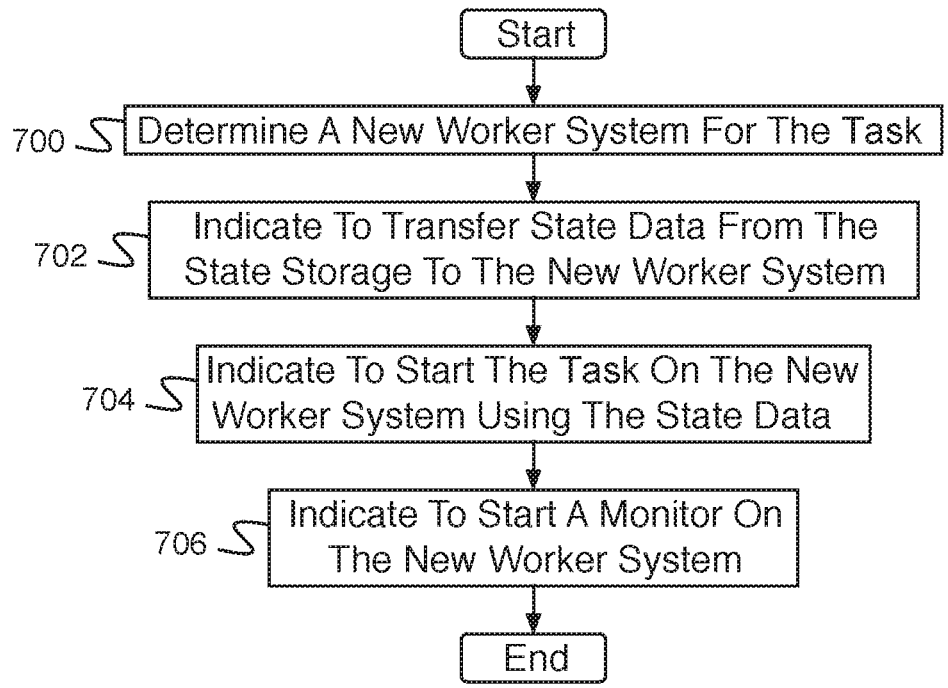
FIG. 7 is a flow diagram illustrating an embodiment of a process for restarting a task using task/job state data stored in a state storage.

FIG. 7 is a flow diagram illustrating an embodiment of a process for restarting a task using task/job state data stored in a state storage. In some embodiments, the process of FIG. 7 implements 504 of FIG. 5. In the example shown, in 700, a new worker system is determined for the task. In various embodiments, the least loaded worker system is chosen, the worker system least recently assigned a job is chosen, a worker system is chosen randomly, worker systems are chosen according to a predetermined order, a worker system is chosen by vote of the worker systems, or a worker system is chosen in any other appropriate way. In 702, it is indicated to transfer state data from the state storage to the new worker system. In 704, it is indicated to start the task on the new worker system using the state data. In 706, it is indicated to start a monitor on the new worker system.

Figure 8:
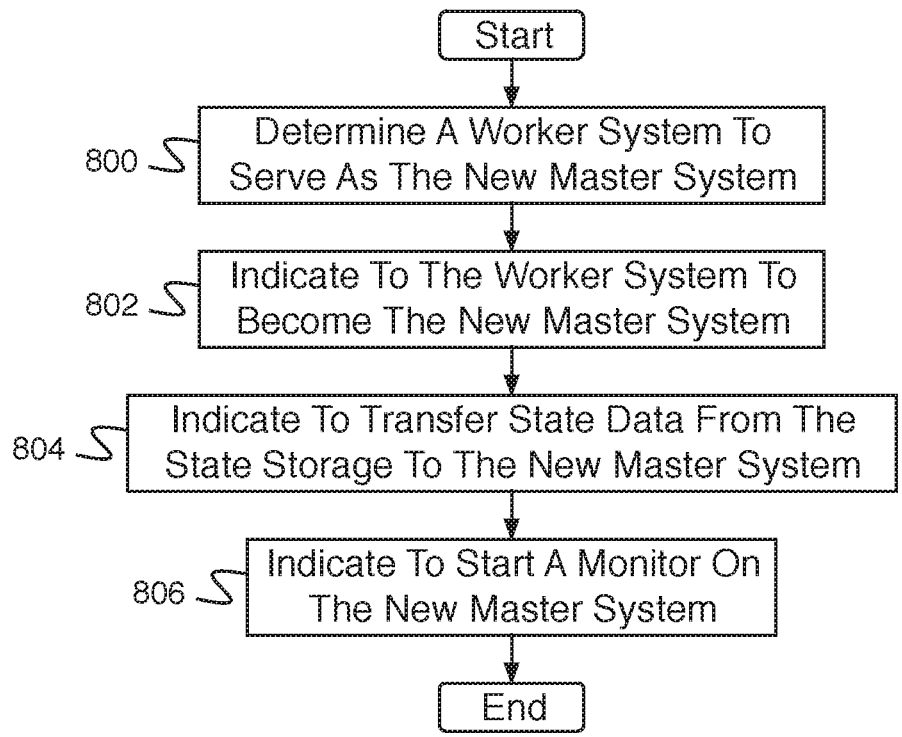
FIG. 8 is a flow diagram illustrating an embodiment of a process for restarting a monitor using monitor state data stored in a state storage.

FIG. 8 is a flow diagram illustrating an embodiment of a process for restarting a monitor using monitor state data stored in a state storage. In some embodiments, the process of FIG. 8 implements 604 of FIG. 6. In the example shown, in 800, the process determines a worker system to serve as the new master system. In various embodiments, the least loaded worker system is chosen, the worker system least recently assigned a job is chosen, a worker system is chosen randomly, worker systems are chosen according to a predetermined order, a worker system is chosen by vote of the worker systems, or a worker system is chosen in any other appropriate way. In 802, it is indicated to the worker system to become the new master system. In 804, it is indicated to transfer state data from the state storage to the new master system. In 806, it is indicated to start a monitor on the new master system.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system with distributed monitoring agents, comprising:
   a state storage;
   a plurality of worker agents, wherein a job is executed using a worker agent of the plurality of worker agents;
   a first processor, wherein the first processor is configured to:
     execute a first monitor to monitor the job;
     determine that the job failed to successfully complete; and
     in response to determining that the job failed to successfully complete:
       request to retrieve job state data stored in the state storage, wherein the job state data is retrieved using a search index comprising a location of the job state data;
       receive the job state data; and
       restart the job using the job state data; and
   a second processor, wherein the second processor is configured to:
     execute a second monitor to monitor the first monitor;
     determine that the first monitor crashes; and
     in response to determining that the first monitor crashes:
       restart the first monitor using first monitor state data stored in the state storage.

2. The system of claim 1, wherein the first monitor comprises a process running on the worker agent of the plurality of worker agents.

3. The system of claim 1, wherein the second monitor comprises a process running on the worker agent of the plurality of worker agents.

4. The system of claim 1, wherein determining that the job failed to successfully complete comprises determining that the worker agent running the job has crashed.

5. The system of claim 1, wherein determining that the job failed to successfully complete comprises determining that the job failed to successfully complete within a job timeout time.

6. The system of claim 1, wherein restarting the job comprises selecting a new worker agent of the plurality of worker agents and restarting the job on the new worker agent.

7. The system of claim 1, wherein restarting the first monitor comprises selecting a new worker agent of the plurality of worker agents and restarting the first monitor on the new worker agent.

8. The system of claim 1, wherein the worker agent of the plurality of worker agents is designated as a master system.

9. The system of claim 8, wherein the worker agent designated as the master system controls job scheduling on other worker agents.

10. The system of claim 8, wherein the first monitor comprises a process running on the master system.

11. The system of claim 10, wherein restarting the first monitor comprises designating a new worker agent of the plurality of worker agents as a new master system.

12. The system of claim 11, wherein restarting the first monitor comprises restarting the first monitor on the new master system.

13. The system of claim 1, wherein the first monitor monitors the second monitor to restart the second monitor using second monitor state data stored in the state storage in the event that the second monitor crashes.

14. The system of claim 1, further comprising one or more additional monitors, wherein each monitor of the one or more additional monitors comprises a process running on a worker agent of the plurality of worker agents, wherein each monitor of the one or more additional monitors the first monitor to restart the first monitor using first monitor state data stored in the state storage in the event that the first monitor crashes.

15. The system of claim 1, wherein the state storage comprises a system running the Apache Zookeeper™ service.

16. The system of claim 1, wherein the state storage comprises two or more redundant backup systems.

17. The system of claim 1, wherein the state storage comprises a cluster system.

18. The system of claim 1, wherein the job provides the job state data to the state storage.

19. The system of claim 1, further comprising a third processor, wherein the third processor is configured to receive the request to retrieve job state data, retrieve the job state data using the search index, and provide the job state data.

20. The system of claim 1, wherein the search index is a first search index, and wherein the second processor is further configured to, in response to determining that the first monitor crashes:
- request to retrieve the first monitor state data, wherein the first monitor state data is retrieved using a second search index comprising a location of the first monitor state data; and
- receive the first monitor state data.

21. A method for distributed monitoring agents, comprising:
- executing a job using a worker agent, comprising a processor, of a plurality of worker agents;
- executing a first monitor to monitor the job;
- determining that the job failed to successfully complete;
- in response to determining that the job failed to successfully complete:
  - requesting to retrieve job state data stored in the state storage, wherein the job state data is retrieved using a search index comprising a location of the job state data;
  - receiving the job state data; and
  - restarting the job using the job state data;
- executing a second monitor to monitor the first monitor;
- determining that the first monitor crashes; and
- in response to determining that the first monitor crashes:
  - restarting the first monitor using first monitor state data stored in the state storage.

22. A computer program product for distributed monitoring agents, the computer program product being embodied in a non-transitory computer readable storage medium and comprising computer instructions for:
- executing a job using a worker agent of a plurality of worker agents;
- executing a first monitor to monitor the job;
- determining that the job failed to successfully complete;
- in response to determining that the job failed to successfully complete:
  - requesting to retrieve job state data stored in the state storage, wherein the job state data is retrieved using a search index comprising a location of the job state data;
  - receiving the job state data; and
  - restarting the job using the job state data;
- executing a second monitor to monitor the first monitor;
- determining that the first monitor crashes; and
- in response to determining that the first monitor crashes:
  - restarting the first monitor using first monitor state data stored in the state storage.

* * * * *